United States Patent
Kato et al.

(10) Patent No.: US 10,975,817 B2
(45) Date of Patent: Apr. 13, 2021

(54) PROTECTOR AND METHOD FOR MANUFACTURING PROTECTOR

(71) Applicant: TOYOTA JIDOSHA KABUSHIKI KAISHA, Toyota (JP)

(72) Inventors: Hiroya Kato, Nisshin (JP); Tomihisa Tsuchiya, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/380,251

(22) Filed: Apr. 10, 2019

(65) Prior Publication Data

US 2019/0331078 A1    Oct. 31, 2019

(30) Foreign Application Priority Data

Apr. 26, 2018 (JP) .............................. JP2018-084996

(51) Int. Cl.

| | |
|---|---|
| *F02M 59/44* | (2006.01) |
| *B29C 70/70* | (2006.01) |
| *B29K 307/04* | (2006.01) |
| *B29K 105/08* | (2006.01) |
| *B29K 101/10* | (2006.01) |

(Continued)

(52) U.S. Cl.
CPC ............. *F02M 59/44* (2013.01); *B29C 70/70* (2013.01); *B29K 2101/10* (2013.01); *B29K 2105/089* (2013.01); *B29K 2307/04* (2013.01); *B29K 2705/00* (2013.01); *B29L 2031/7496* (2013.01)

(58) Field of Classification Search
CPC ...... F02M 59/44; F02M 59/445; F02M 59/00; F02M 63/00; F02M 37/02; F02M 2200/8046; F02M 2200/803; F02M 2200/9015; F02M 2200/185; B29C 70/70; B29L 2031/7496; B29K 23/0704; B29K 2105/089; B29K 2101/10; B29K 2705/00
See application file for complete search history.

(56) References Cited

U.S. PATENT DOCUMENTS 3,659,471 A * 5/1972 Marsch .................... F16H 55/36
474/93
4,363,581 A * 12/1982 Pease .................... B29C 70/682
411/176

(Continued)

FOREIGN PATENT DOCUMENTS

| | | |
|---|---|---|
| JP | 2004-360581 | 12/2004 |
| JP | 2012-241819 | 12/2012 |

(Continued)

*Primary Examiner* — Grant Moubry
(74) *Attorney, Agent, or Firm* — Oblon, McClelland, Maier & Neustadt, L.L.P.

(57) ABSTRACT

A protector protects a high-pressure fuel pump for an internal combustion engine. A metal collar is insert-molded into a plate-shaped fiber reinforced plastic portion made of a fiber reinforced plastic of the protector. An outer circumferential surface of the collar includes an uneven portion and a smooth surface. The uneven portion includes recesses and projections arranged alternately in a thickness direction of the fiber reinforced plastic portion. The smooth portion includes a smooth surface parallel to the thickness direction of the fiber reinforced plastic portion. The uneven portion and the smooth portion are arranged in the thickness direction on the outer circumferential surface of the collar.

6 Claims, 6 Drawing Sheets

(51) Int. Cl.
*B29L 31/00* (2006.01)
*B29K 705/00* (2006.01)

(56) References Cited

U.S. PATENT DOCUMENTS

| | | | |
|---|---|---|---|
| 7,189,920 B2* | 3/2007 | Asao | B29C 45/14065 |
| | | | 174/50 |
| 9,127,628 B2* | 9/2015 | Egawa | F02M 35/10085 |
| 10,132,342 B2* | 11/2018 | Mori | B29C 66/21 |
| 10,340,626 B2* | 7/2019 | Kondo | H01R 13/512 |
| 2007/0062841 A1* | 3/2007 | Nakamura | B60K 15/03177 |
| | | | 206/562 |
| 2012/0006304 A1* | 1/2012 | Wakabayashi | F02M 37/043 |
| | | | 123/509 |
| 2014/0212624 A1* | 7/2014 | Ayuzawa | B32B 5/26 |
| | | | 428/137 |
| 2015/0015006 A1 | 1/2015 | Yabu et al. | |
| 2020/0096036 A1* | 3/2020 | Stumpf | B29C 37/0082 |

FOREIGN PATENT DOCUMENTS

| | | |
|---|---|---|
| JP | 2013-257009 | 12/2013 |
| JP | 2014-101807 | 6/2014 |
| JP | 2017-036008 | 2/2017 |
| WO | WO 2013/031360 A1 | 3/2013 |
| WO | WO 2013/094515 A1 | 6/2013 |
| WO | WO-2016117062 A1 * 7/2016 ............ B29C 66/21 |  |

\* cited by examiner

PROTECTOR AND METHOD FOR MANUFACTURING PROTECTOR

BACKGROUND

1. Field

The following description relates to a protector that protects a high-pressure fuel pump for an internal combustion engine. The protector is coupled to the engine body of the internal combustion engine.

2. Description of Related Art

Japanese Laid-Open Patent Publication No. 2014-101807 discloses an internal combustion engine including a protector that protects a high-pressure fuel pump. The protector and the high-pressure fuel pump are fastened to the head cover in the engine body by bolts.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Examples of the present disclosure will now be described.

Example 1

A protector according to one aspect of the present disclosure includes a plate-shaped fiber reinforced plastic portion made of a fiber reinforced plastic. The protector also includes a metal collar insert-molded into the fiber reinforced plastic portion. The protector and a high-pressure fuel pump are fastened to an engine body of an internal combustion engine by a bolt inserted through the collar. The protector protects the high-pressure fuel pump. An outer circumferential surface of the collar includes an uneven portion and a smooth portion. The uneven portion includes recesses and projections arranged alternately in a thickness direction of the fiber reinforced plastic portion. The smooth portion includes a smooth surface parallel to the thickness direction. The uneven portion and the smooth portion are arranged in the thickness direction on the outer circumferential surface of the collar.

Since the smooth portion differs from the uneven portion in that plastic sufficiently enters the inner part during insert-molding, the plastic portion is easily in close contact with the smooth portion. Thus, when the uneven portion is arranged on the outer circumferential surface of the collar and the smooth portion is arranged next to the uneven portion in the thickness direction of the plate-shaped fiber reinforced plastic portion as described above, the passage of oil or rainwater is prevented at the smooth portion, thereby ensuring the sealing performance. Accordingly, the uneven portion restricts the removal of the collar, and the smooth portion ensures the sealing performance. That is, the removal of the collar and the ensuring of the sealing performance are both achieved.

In order to reduce the weight of the internal combustion engine, the protector may be made of reinforced fiber plastic, which has a higher specific strength than, for example, cast iron.

When the plastic protector is fastened by bolts and used under a high-temperature environment, the portions of the protector that are fastened by the bolts may undergo creep deformation. When the creep deformation occurs, the fastening force produced by the bolts becomes low, thereby facilitating loosening of the bolts. To cope with this problem, metal collars, which are less likely to undergo creep deformation than plastic, may configure the portions of the protector through which the bolts are inserted. The above-described structure is modified based on such assumption.

Example 2

In the protector according to example 1, the fiber reinforced plastic portion has reinforcing fibers that are laminated in the thickness direction.

When reinforcing fibers are laminated in the thickness direction of the plate-shaped fiber reinforced plastic portion, thermal expansion or thermal contraction does not easily occur in the direction orthogonal to the thickness direction of the plate-shaped fiber reinforced plastic portion. In contrast, thermal expansion or thermal contraction easily occurs in the thickness direction. Thus, for example, when the uneven portion is formed on the entire outer circumferential surface of the collar, the collar and the plastic portion are easily separated from each other at the portions of the front surface and the rear surface of the protector. This causes oil or rainwater to easily enter the boundary surface between the collar and the plastic portion.

In the above-described structure, the boundary surface between the smooth portion and the plastic portion is parallel to the thickness direction of the plate-shaped fiber reinforced plastic portion. Thus, even if the difference in thermal expansion coefficient between plastic and metal causes displacement in the thickness direction between the plastic portion and the metal portion on the boundary surface, the formation of gaps is limited. Accordingly, when the uneven portion is arranged on the outer circumferential surface of the collar and the smooth portion is arranged next to the uneven portion in the thickness direction of the fiber reinforced plastic portion as described above, the smooth portion prevents the passage of oil or rainwater. This ensures the sealing performance. Thus, the uneven portion prevents removal of the collar, and the smooth portion ensures the sealing performance. That is, the removal of the collar and the limiting in decreases in the sealing performance that results from the difference in thermal expansion coefficient are both achieved.

Example 3

In the protector according to example 1 or 2, the smooth portion is one of two smooth portions. The uneven portion is located between the two smooth portions in the thickness direction on the outer circumferential surface of the collar.

Plastic does not easily enter the uneven portion during insert-molding. Thus, gaps may be formed between the plastic portion and the uneven portion. In the above-described structure, the uneven portion is located between the two smooth portions. This allows the smooth portions to seal oil or rainwater on the two sides of the uneven portion and thus prevents oil or rainwater from entering the uneven portion.

Example 4

In the protector according to example 3, the protector includes a front surface and a rear surface. The collar includes a collar front surface exposed on the front surface of the protector and a collar rear surface exposed on the rear surface of the protector. The outer circumferential surface of the collar includes a front surface adjacent portion adjacent to the collar front surface and a rear surface adjacent portion adjacent to the collar rear surface. The front surface adjacent portion and the rear surface adjacent portion are the smooth portions.

In the above-described structure, the smooth portions are respectively arranged at the portions of the outer circumferential surface of the collar that are adjacent to the front surface and the rear surface of the protector. This ensures the sealing performance. Thus, the entry of oil or rainwater from the front surface and the rear surface of the protector is prevented. That is, oil or rainwater is prevented from entering the entire boundary surface between the collar and the plastic portion.

Example 5

In the protector according to example 3 or 4, the uneven portion is located at a middle part of the outer circumferential surface of the collar in the thickness direction. Each of the two smooth portions, between which the uneven portion is located, accounts for twenty percent or more of a dimension of the collar in the thickness direction.

The above-described structure ensures the areas occupied by the smooth portions on the outer circumferential surface of the collar and thus ensures the sealing performance.

Example 6

In the protector according to any one of examples 1 to 5, the fiber reinforced plastic is a carbon fiber reinforced plastic.

Among fiber reinforced plastics, carbon fiber reinforced plastic particularly has a high specific strength. Thus, the weight of the internal combustion engine is reduced in the above-described structure.

Example 7

A method for manufacturing a protector that protects a high-pressure fuel pump for an internal combustion engine is provided. The method includes preparing a cylindrical metal collar, arranging the collar in a mold; filling the mold, in which the collar is arranged, with fiber reinforced plastic, and applying pressure to the fiber reinforced plastic, which fills the mold, to insert-mold the collar into the fiber reinforced plastic, thereby forming a plate-shaped fiber reinforced plastic portion. The protector and the high-pressure fuel pump are fastened to an engine body of the internal combustion engine by a bolt inserted through the collar. The preparing the collar includes preparing an uneven portion and a smooth portion on an outer circumferential surface of the collar. The uneven portion includes recesses and projections arranged alternately in an axial direction of the collar. The smooth portion includes a smooth surface parallel to the axial direction. The uneven portion and the smooth portion are arranged in the axial direction on the outer circumferential surface of the collar.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

A protector 160 coupled to the engine body of an internal combustion engine 100 according to an embodiment of the present disclosure will now be described with reference to FIGS. 1 to 9.

Figure 1:
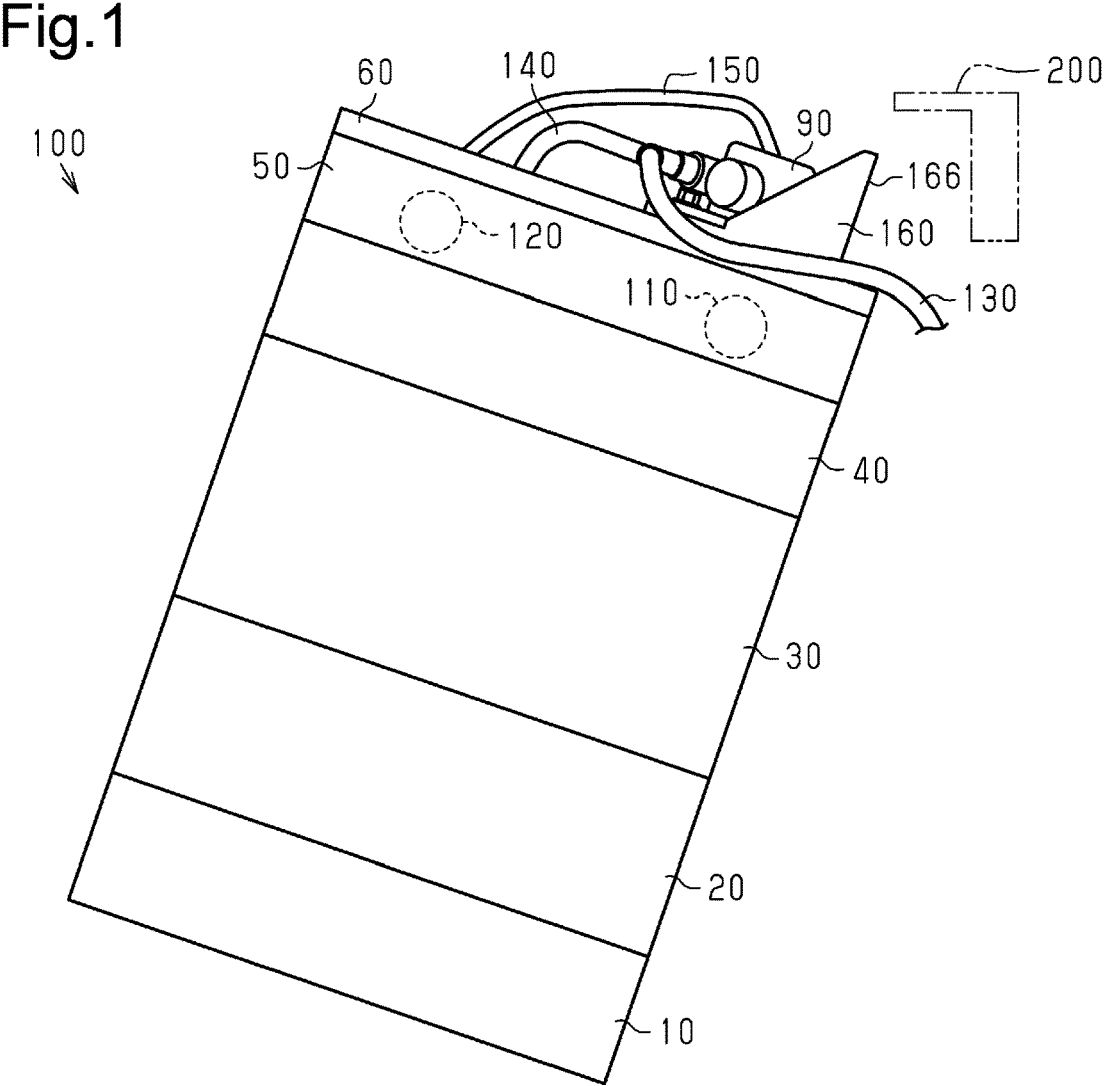
FIG. 1 is a schematic view illustrating where a high-pressure fuel pump and a protector are installed in an internal combustion engine of the present disclosure.

As shown in FIG. 1, a crankcase 20 is coupled to the lower part of a cylinder block 30 of the internal combustion engine 100. An oil pan 10 is coupled to the lower end of the crankcase 20. A cylinder head 40 is coupled to the upper end of the cylinder block 30. A cam housing 50 is coupled to the upper end of the cylinder head 40. A cylinder head cover 60 is coupled to the upper end of the cam housing 50. The oil pan 10, the crankcase 20, the cylinder block 30, the cylinder head 40, the cam housing 50, and the cylinder head cover 60 are assembled to configure the engine body of the internal combustion engine 100.

A high-pressure fuel pump 90 and the protector 160 are coupled to the upper part of the engine body. That is, the high-pressure fuel pump 90 is located at the upper part of the cylinder head cover 60. The high-pressure fuel pump 90 compresses fuel supplied through a fuel supply pipe 130 to supply an in-cylinder fuel injection valve with high-pressure fuel through a high-pressure fuel pipe 150.

The cam housing 50 accommodates an intake camshaft 120 and an exhaust camshaft 110. The high-pressure fuel pump 90 is a plunger pump that is driven by the exhaust camshaft 110 and coupled to the upper side of the exhaust camshaft 110.

FIG. 1 shows the position of the internal combustion engine 100 installed in a vehicle. In FIG. 1, the left side corresponds to the front side of the vehicle, and the right side corresponds to the rear side of the vehicle. The internal combustion engine 100 is installed in the vehicle with the upper part of the internal combustion engine 100 inclined rearward such that the upper side of the internal combustion engine 100 is located rearward. As shown by the long dashed double-short dashed line, a cowl top panel 200 is arranged rearward from the high-pressure fuel pump 90 with the internal combustion engine 100 installed in the vehicle. The cowl top panel 200 is one of the components that configure the vehicle body.

When the vehicle collides with an object from the front, the collision deforms the front part of the vehicle, i.e., deforms the engine compartment accommodating the internal combustion engine 100. As a result, the internal combustion engine 100 moves rearward. This causes the protector 160 to abut the cowl top panel 200 and thus limits the collision of the high-pressure fuel pump 90 with the cowl top panel 200. That is, the protector 160 is arranged to protect the high-pressure fuel pump 90.

Figure 2:
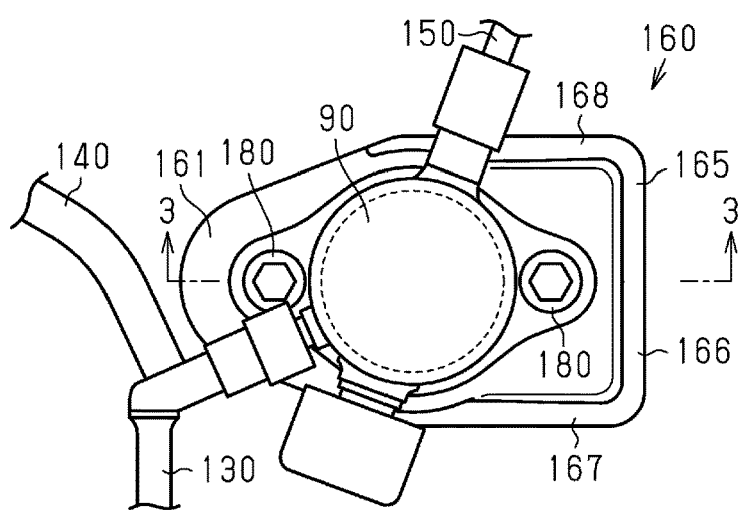
FIG. 2 is a plan view of the high-pressure fuel pump and the protector in the internal combustion engine shown in FIG. 1.

As shown in FIG. 2, at the front side of the high-pressure fuel pump 90, the fuel supply pipe 130 branches into a pipe connecting to the high-pressure fuel pump 90 and a low-pressure fuel pipe 140. Fuel that has not been supplied from the fuel supply pipe 130 to the high-pressure fuel pump 90 is supplied to a port fuel injection valve through the low-pressure fuel pipe 140.

Figure 3:
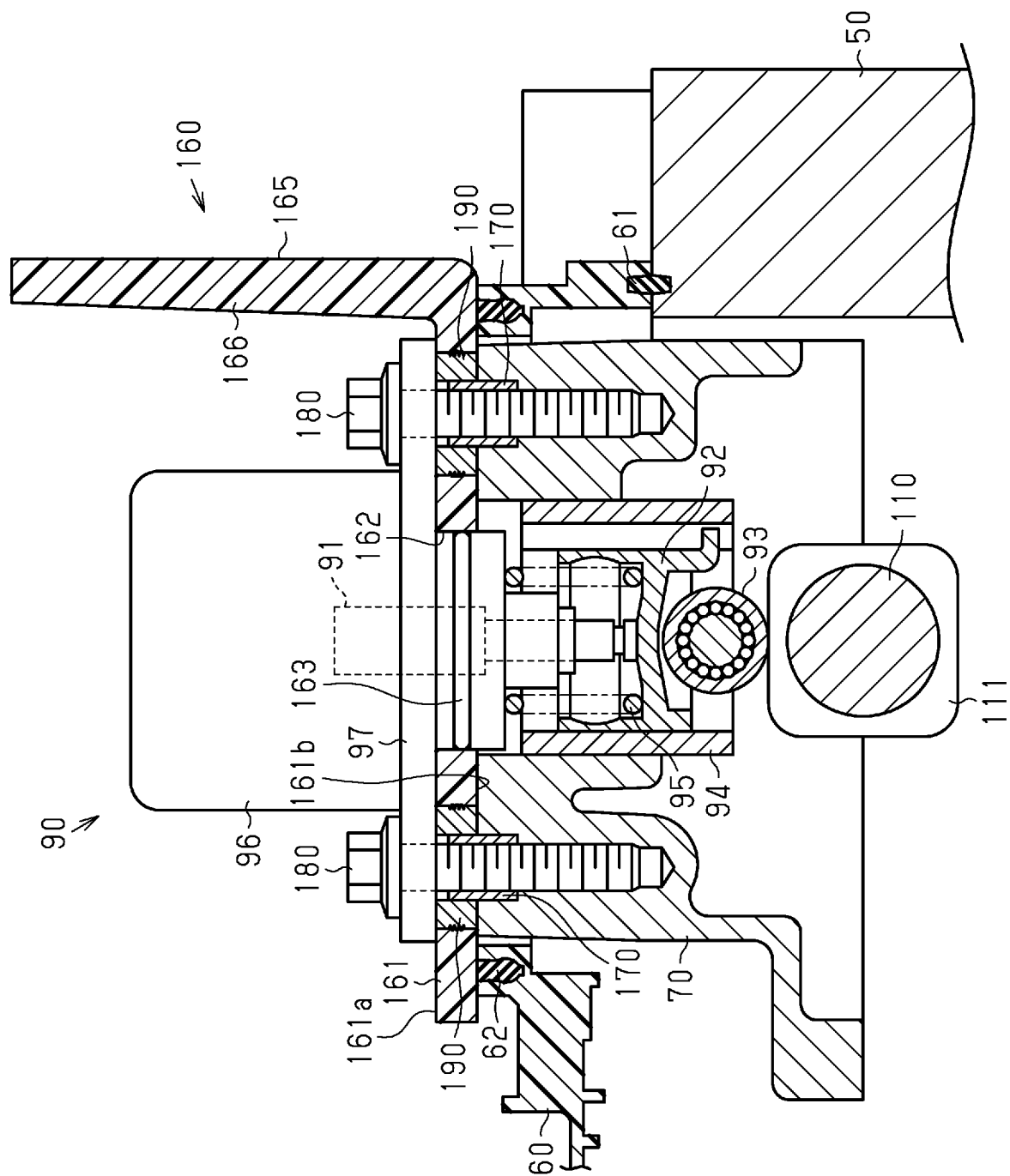
FIG. 3 is a cross-sectional view taken along line 3-3 in FIG. 2.
Figure 4:
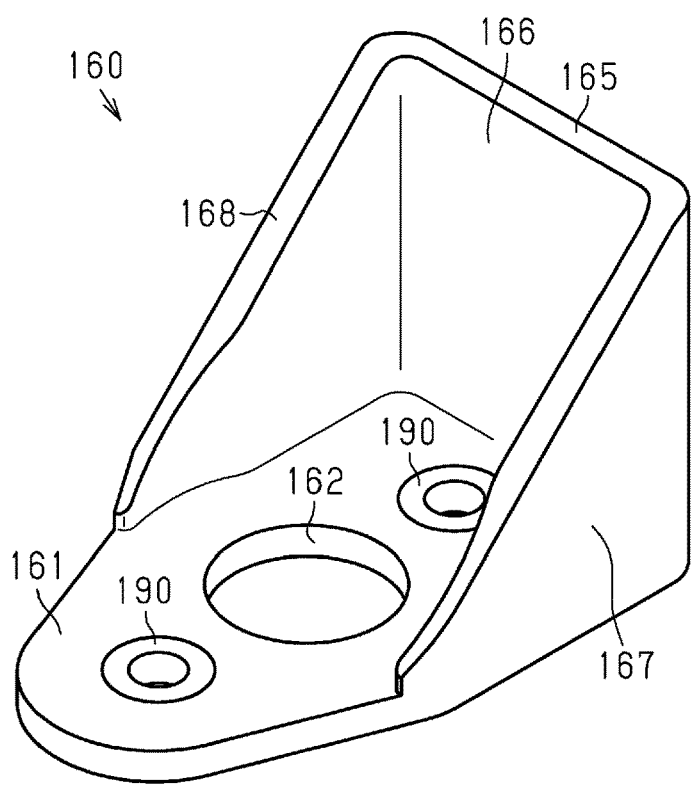
FIG. 4 is a perspective view of the protector shown in FIG. 3.

As shown in FIGS. 2 to 4, the protector 160 includes a bottom plate 161 and a wall plate 165 extending upward from the bottom plate 161.

As shown in FIG. 4, the bottom plate 161 has a through-hole 162. As shown in FIG. 3, a plunger 91 of the high-pressure fuel pump 90 is inserted through the through-hole 162 into the cam housing 50. The part between the high-pressure fuel pump 90 and the inner wall surface of the through-hole 162 is sealed by a rubber seal ring 163 fitted to the high-pressure fuel pump 90.

As shown in FIG. 3, the cam housing 50 includes a metal cam cap 70. In the cam housing 50, the exhaust camshaft 110 is rotationally supported by the cam cap 70 placed over the exhaust camshaft 110 from above.

The exhaust camshaft 110 includes a cam 111 that drives the high-pressure fuel pump 90. The cam 111 abuts a roller 93 on a lifter 92 of the high-pressure fuel pump 90. The cam cap 70 accommodates the lifter 92. A lifter guide 94 that guides vertical movement of the lifter 92 is fitted to the cam cap 70. The distal end of the plunger 91 is coupled to the lifter 92, and the plunger 91 and the lifter 92 are pushed down by a spring 95 toward the cam 111.

The cylinder head cover 60 opens such that the upper surface of the cam cap 70 is exposed. The protector 160 and the high-pressure fuel pump 90 are provided to close the opening of the cylinder head cover 60. A first oil seal 61 is fitted to a sealed portion of the cylinder head cover 60 and the cam housing 50, and a second oil seal 62 is fitted to a sealed portion of the bottom plate 161 of the protector 160 of the cylinder head cover 60.

The protector 160 is a plastic molding component made of a carbon fiber reinforced plastic. As shown in FIGS. 3 and 4, two metal collars 190 having a flat tubular shape are embedded into the bottom plate 161 (a fiber reinforced plastic portion).

As shown in FIG. 3, two tubular retainers 170 are fitted to the upper surface of the cam cap 70. The two retainers 170 are respectively inserted through the two collars 190 so that the protector 160 is positioned with respect to the cam cap 70. With the protector 160 positioned in such a manner, bolts 180 are used to fasten the protector 160 and the high-pressure fuel pump 90 to the mounting surface of the cam cap 70. More specifically, the bottom plate 161 of the protector 160 is held between a flange 97 arranged on the cover 96 of the high-pressure fuel pump 90 and the mounting surface of the cam cap 70. With the bottom plate 161 held between the flange 97 and the mounting surface in such a manner, the flange 97 of the high-pressure fuel pump 90 and the bottom plate 161 of the protector 160 are fastened to the mounting surface of the cam cap 70 by the bolts 180 to fix the protector 160 to the cam cap 70. This allows the high-pressure fuel pump 90 to be fastened to the outer side of the engine body with the plastic protector 160 held between the cam cap 70 and the flange 97 arranged on the cover 96, which surrounds a fuel chamber of the high-pressure fuel pump 90.

As shown in FIG. 3, the diameter of each collar 190 is slightly larger than the diameter of the head of the corresponding bolt 180.

As shown in FIGS. 2 and 4, the wall plate 165 of the protector 160 includes a front wall 166, a first side wall 167, and a second side wall 168. The front wall 166 is located at the rear side. As shown in FIG. 1, the front wall 166 is opposed to the cowl top panel 200. The first side wall 167 and the second side wall 168 respectively extend frontward from the opposite ends of the front wall 166.

As shown in FIG. 4, the first side wall 167 and the second side wall 168 become lower toward the front side. As shown in FIG. 2, this allows the first side wall 167, the second side wall 168, and the front wall 166 to surround the cover 96 of the high-pressure fuel pump 90 while avoiding interference with the fuel pipes.

The arrangement of the first side wall 167 and the second side wall 168 limits deformation of the front wall 166 in the front-rear direction of the vehicle, thereby increasing the strength of the protector 160.

If load acts on the protector 160 to cause the collars 190 to come off from the bottom plate 161, the protector 160 is displaced from the high-pressure fuel pump 90. This prevents the protector 160 from properly protecting the high-pressure fuel pump 90.

Figure 5:
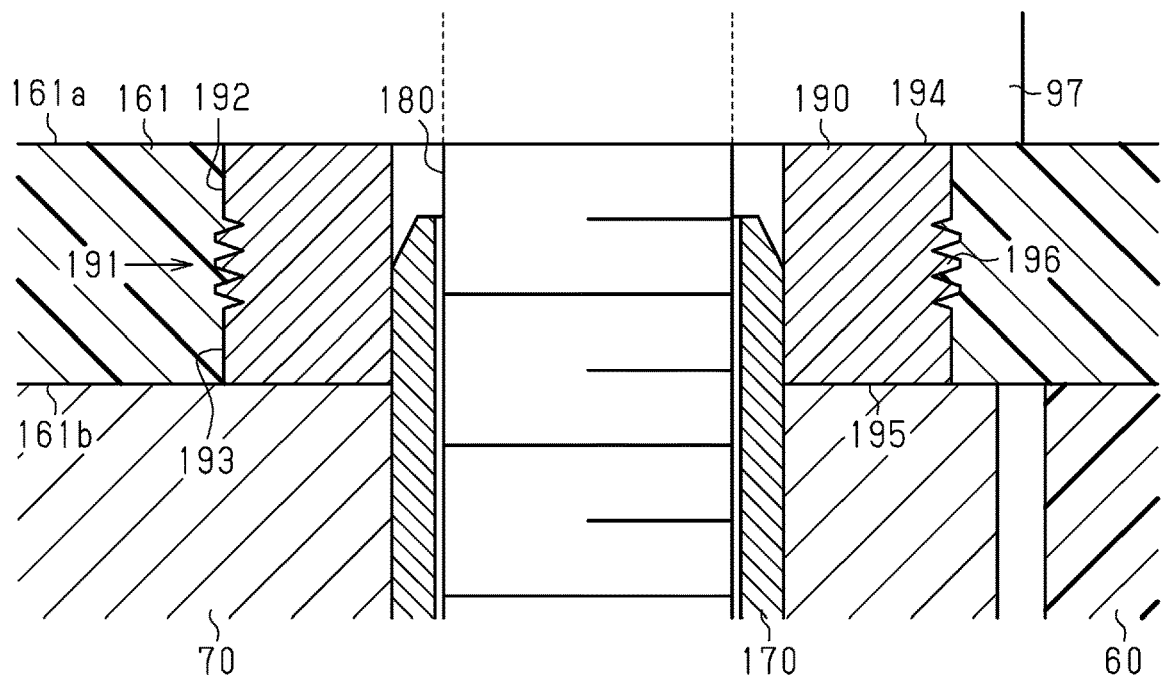
FIG. 5 is an enlarged cross-sectional view of the vicinity of one of the collars shown in FIG. 3.

As shown in FIG. 5, the protector 160 includes an uneven portion 191 on the outer circumferential surface of each collar 190, which is annular, in order to prevent the removal of the collar 190 from the bottom plate 161. The uneven portion 191 is located at the middle part of the annular collar 190 in the thickness direction. The thickness direction of the collar 190 is orthogonal to the radial direction of the collar 190. The thickness direction of the collar 190 coincides with the thickness direction of the protector 160, that is, coincides with the thickness direction of the bottom plate 161 (the fiber reinforced plastic portion). Further, since the collar 190 has a flat cylindrical shape, the thickness direction of the collar 190 coincides with the axial direction of the collar 190. The uneven portion 191 includes three protrusions 196, each having a V-shaped cross section. The protrusions 196 are arranged in the thickness direction of the collar 190. Each protrusion 196 extends around the entire outer circumferential surface of the collar 190.

The outer circumferential surface of the collar 190 includes a front surface adjacent portion adjacent to the front surface (collar front surface 194) of the collar 190. The front surface adjacent portion serves as a front smooth portion 192 configured by a smooth surface arranged in parallel to the thickness direction of the collar 190. Further, the outer circumferential surface of the collar 190 includes a rear surface adjacent portion adjacent to the rear surface (collar rear surface 195) of the collar 190. The rear surface adjacent portion serves as a rear smooth portion 193 configured by a smooth surface arranged in parallel to the thickness direction of the collar 190. The collar front surface 194 is exposed on a front surface 161a of the bottom plate 161, and the collar rear surface 195 is exposed on a rear surface 161b of the bottom plate 161.

In the uneven portion 191, a trough is formed between the front smooth portion 192 and a protrusion 196 closest to the collar front surface 194, and a trough is formed between the rear smooth portion 193 and a protrusion 196 closest to the collar rear surface 195. Further, troughs are formed between the three protrusions 196. Accordingly, the uneven portion 191 has four troughs and three protrusions 196 arranged alternately in the thickness direction and thus has recesses and projections arranged alternately in the thickness direction.

More specifically, the outer circumferential surface of each collar 190 includes the uneven portion 191, the front smooth portion 192, and the rear smooth portion 193. The uneven portion 191 includes recesses and projections arranged alternately in the thickness direction of the collar 190. The front smooth portion 192 and the rear smooth portion 193 include no recess or projection and are thus smooth portions configured by smooth surfaces arranged in parallel to the thickness direction of the collar 190. On the outer circumferential surface of the collar 190, the uneven portion 191 is located between the front smooth portion 192 and the rear smooth portion 193 in the thickness direction of the collar 190.

As shown in FIG. 5, approximately one third of the outer circumferential surface of the collar 190 located closer to the collar front surface 194 in the dimension of the thickness direction of the collar 190 is the front smooth portion 192. Further, approximately one third of the outer circumferential surface of the collar 190 located closer to the collar rear surface 195 in the dimension of the thickness direction of the collar 190 is the rear smooth portion 193. The remaining approximately one third of the outer circumferential surface of the collar 190 located at the middle part in the dimension of the thickness direction of the collar 190 is the uneven portion 191. That is, in the collar 190, each of the front smooth portion 192 and the rear smooth portion 193, between which the uneven portion 191 at the middle part is located, accounts for twenty percent or more of the collar 190 in the dimension of the thickness direction of the collar 190.

Referring to FIG. 5, in the protector 160, plastic enters the troughs of the uneven portions 191 to harden. Thus, when load acts on the protector 160 fastened to the engine body by the bolts 180 inserted through the collars 190, the engagement of the protrusions 196 with the plastic in the troughs prevents the collars 190 from being removed from the protector 160. That is, in the protector 160, the arrangement of the uneven portions 191 produces an anchor effect, thereby preventing removal of the collars 190.

In the protector 160, the above-described structure is achieved through insert-molding. The method for manufacturing the protector 160 will now be described.

A preform in which thermosetting plastic is used as a base material and carbon fibers are used as reinforcing fibers is inserted into a mold and then compressed. The preform is heated in this state to harden the thermosetting plastic. In this manner, the protector 160 is manufactured. The preform is configured by laminating, on a fabric into which carbon fibers are woven, sheets to which thermosetting plastic is applied and that is impregnated with the thermosetting plastic. In the preform, the sheets of the carbon fiber plastic are laminated in the thickness direction of the preform. Thus, the extending direction of the carbon fibers, which are reinforcing fibers of the preform, is perpendicular to the thickness direction of the preform.

In the step of molding the protector 160, each metal collar 190 is insert-molded into a carbon fiber reinforced plastic portion, which is made of the carbon fiber reinforced plastic, by compressing and heating the preform with the collar 190 arranged in the mold.

Figure 6:
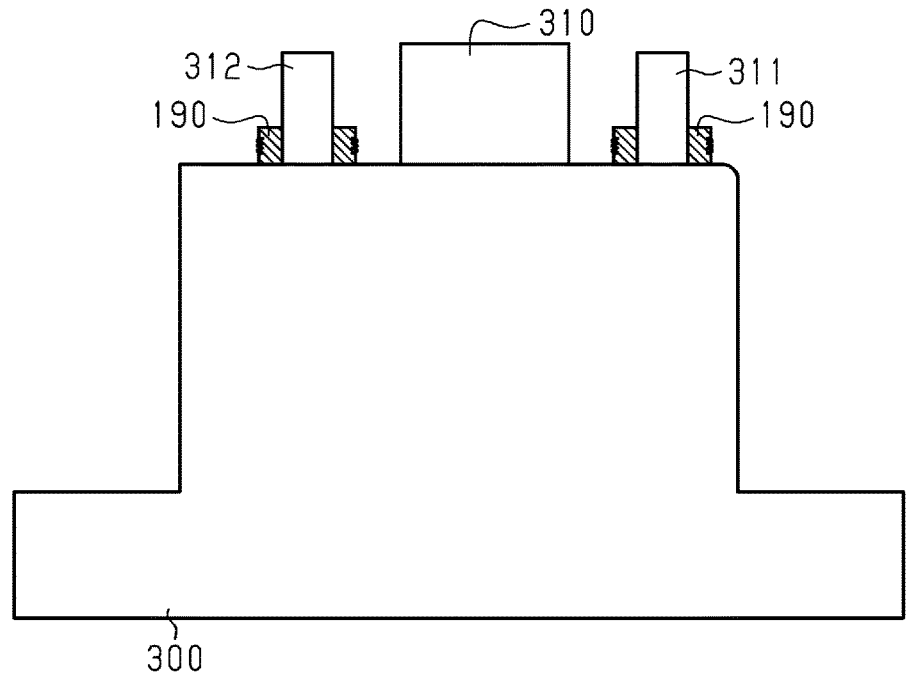
FIG. 6 is a schematic view illustrating a state in which the collars are arranged on a lower mold in a method for manufacturing the protector shown in FIG. 5.

More specifically, first, as shown in FIG. 6, the two collars 190 are respectively fitted to a first small-diameter pin 311 and a second small-diameter pin 312 of a lower mold 300 so that the two collars 190 are arranged on the lower mold 300. The lower mold 300 includes a large-diameter pin 310 arranged between the first small-diameter pin 311 and the second small-diameter pin 312. The large-diameter pin 310 has a larger diameter than the first small-diameter pin 311 and the second small-diameter pin 312. The large-diameter pin 310 has the same diameter as the through-hole 162 of the protector 160. The first small-diameter pin 311 and the second small-diameter pin 312 are positioned relative to the large-diameter pin 310. The diameters of the first small-diameter pin 311 and the second small-diameter pin 312 are slightly smaller than the inner diameters of the collars 190. Thus, fitting the collars 190 to the first small-diameter pin 311 and the second small-diameter pin 312 allows the collars 190 to be positioned relative to the large-diameter pin 310, i.e., the through-hole 162 in the protector 160.

Figure 7:
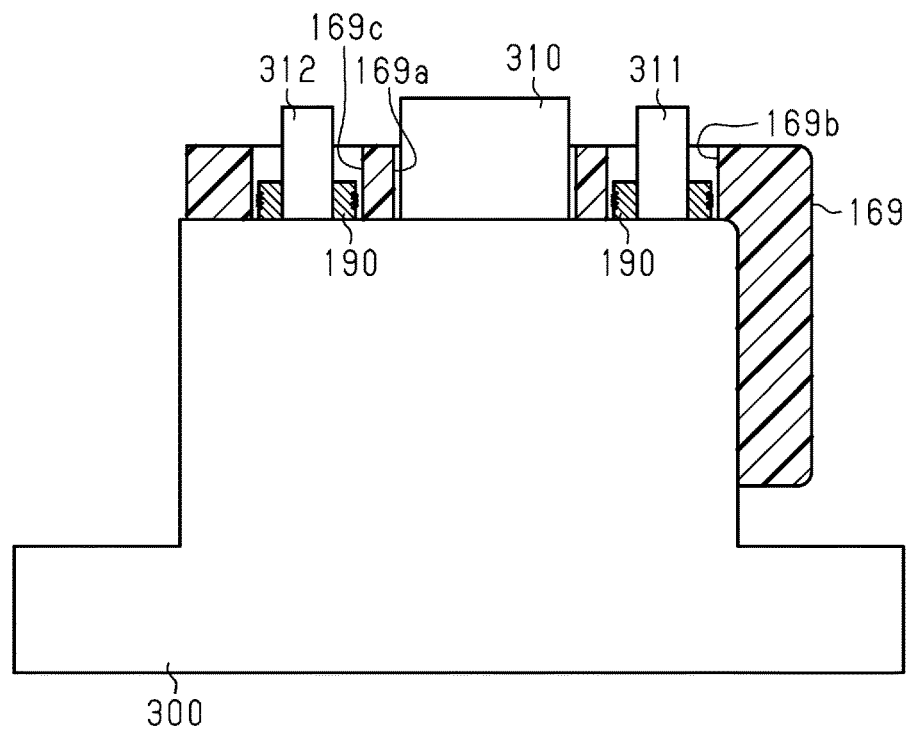
FIG. 7 is a schematic view illustrating a state in which a preform is arranged on the lower mold subsequent to the state of FIG. 6.

Next, as shown in FIG. 7, a preform 169 is arranged on the lower mold 300, on which the collars 190 are arranged. At this stage, the preform 169 has a large-diameter hole 169a, a first small-diameter hole 169b, and a second small-diameter hole 169c. The large-diameter pin 310 is inserted through the large-diameter hole 169a. The collar 190 fitted to the first small-diameter pin 311 is inserted through the first small-diameter hole 169b. The collar 190 fitted to the second small-diameter pin 312 is inserted through the second small-diameter hole 169c.

Figure 8:
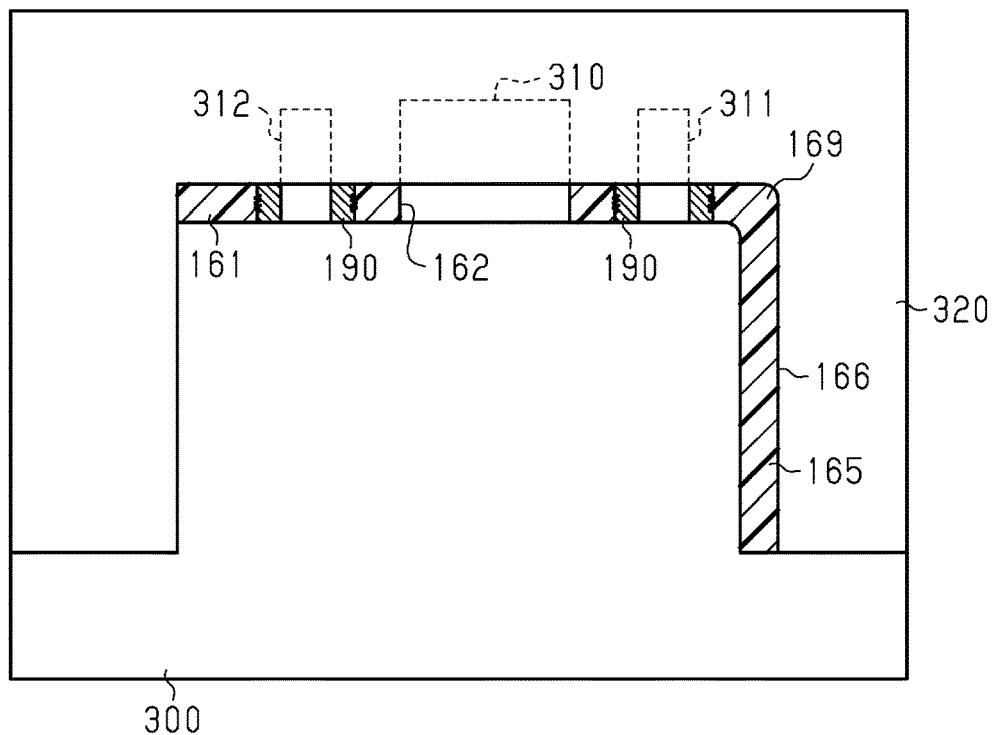
FIG. 8 is a schematic view illustrating a state in which the protector is being molded subsequent to the state of FIG. 7.

After the preform 169 is arranged as shown in FIG. 7, an upper mold 320 is fitted to the lower mold 300 to compress the preform 169 as shown in FIG. 8. In addition to the compression of the preform 169, the upper mold 320 and the lower mold 300 are heated to harden the thermosetting plastic of which the preform 169 is made. When the upper mold 320 and the lower mold 300 compress the preform 169, carbon fiber reinforced plastic derived from the preform 169 expands in the molds (upper mold 320 and lower mold 300). This forms the bottom plate 161 and the wall plate 165. Further, the carbon fiber reinforced plastic enters the troughs of the uneven portions 191 of the collars 190. Thus, the collar 190 is insert-molded. In addition, the carbon fiber reinforced plastic portion comes in contact with the large-diameter pin 310 to form the through-hole 162. In this manner, the protector 160 is manufactured with the carbon fiber reinforced plastic portion, which is plate-shaped and in which reinforced carbon fibers are laminated in the thickness direction of the carbon fiber reinforced plastic portion, and with the metal collar 190, which is insert-molded into the carbon fiber reinforced plastic portion.

The operation of the protector 160 of the present embodiment will now be described.

When the vehicle collides with an object from the front so that the front part of the vehicle deforms rearward, the deformation of the front part of the vehicle causes the internal combustion engine 100 to move rearward. In the internal combustion engine 100, which includes the protector 160, the front wall 166 of the wall plate 165 of the protector 160 is arranged rearward from the high-pressure fuel pump 90. Thus, when the internal combustion engine 100 moves rearward, the front wall 166 abuts the cowl top panel 200, thereby preventing the high-pressure fuel pump 90 from colliding with the cowl top panel 200. That is, since the high-pressure fuel pump 90 is protected by the protector 160, the high-pressure fuel pump 90 is prevented from directly colliding with the cowl top panel 200.

In addition, the protector 160 includes the uneven portion 191 on the outer circumferential surface of the collar 190. Thus, even if load acts on the protector 160, the anchor effect limits removal of the collar 190 from the protector 160.

Figure 9:
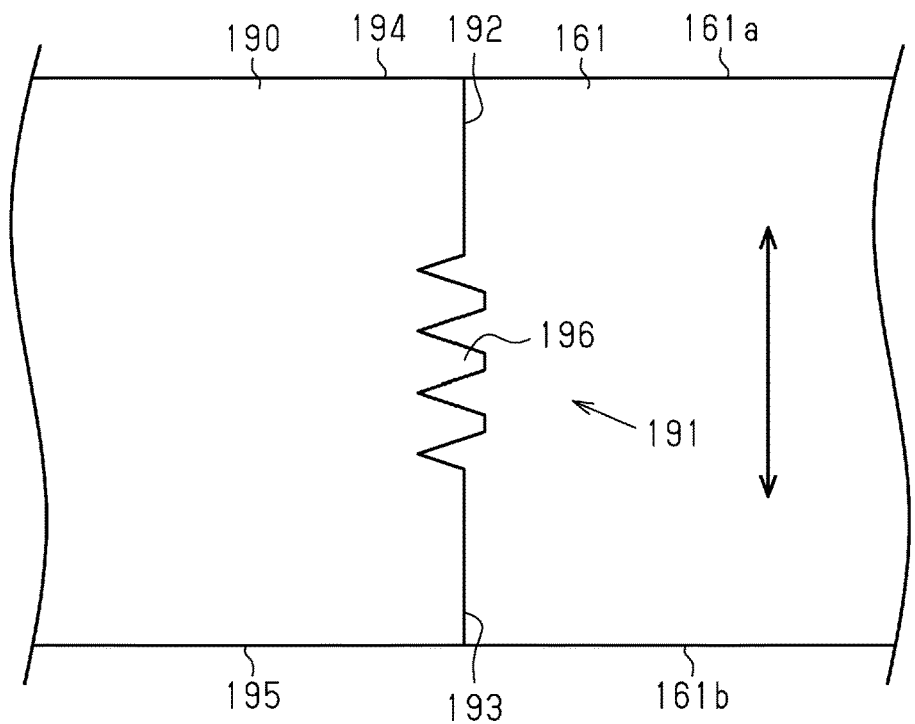
FIG. 9 is an enlarged schematic view showing the boundary between the collar and the plastic portion in the protector of FIG. 5.

As shown in FIG. 9, the outer circumferential surface of the collar 190 includes the front smooth portion 192, which is arranged closer to the collar front surface 194, the rear smooth portion 193, which is arranged closer to the collar rear surface 195, and the uneven portion 191, which is located at the middle part of the collar 190 in the thickness direction and between the front smooth portion 192 and the rear smooth portion 193. In the carbon fiber reinforced plastic portion configuring the bottom plate 161, carbon fibers are laminated in the thickness direction. Thus, the extending direction of the carbon fibers is orthogonal to the thickness direction of the bottom plate 161. The fiber reinforced plastic portion resists deforming in the extending direction of the carbon fibers. Thus, displacement of the carbon fiber reinforced plastic portion, which configures the bottom plate 161, resulting from thermal expansion or thermal contraction occurs especially in the thickness direction of the bottom plate 161 as shown by the double-sided arrow in FIG. 9.

Figure 10:
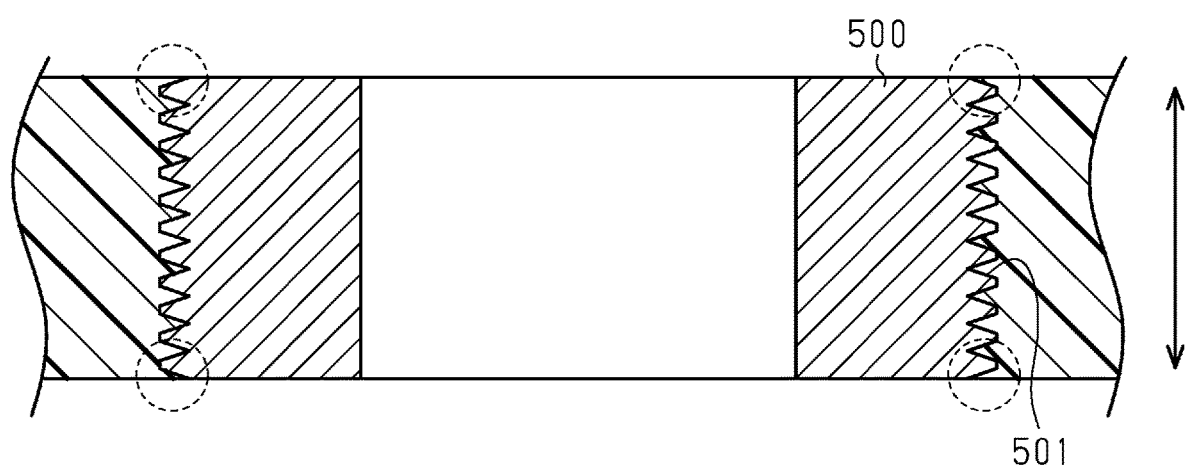
FIG. 10 is a cross-sectional view of a protector in a comparative example.

As a comparative example, grooves 501 may be arranged on the entire outer circumferential surface of a metal collar 500 as shown in FIG. 10. This prevents the collar 500 from coming off from the grooves 501 even if load acts on the protector during insert-molding of the collar 500.

However, when such grooves are provided, plastic may not sufficiently enter the inner part of each groove during insert-molding, thereby forming gaps. When such gaps exist, the sealing performance may not be sufficiently ensured.

Thus, in a fiber reinforced plastic protector in which a metal collar is insert-molded, it is desired that the collar be prevented from being removed and that the sealing performance be ensured.

More specifically, as shown in FIG. 10, an uneven portion may be arranged over the entire outer circumferential surface of the collar 500. In such a case, when thermal expansion causes the fiber reinforced plastic portion to be displaced in the thickness direction of the collar 500, the displacement difference between the fiber reinforced plastic portion and the metal collar 500 may cause the collar 500 to be easily separated from the plastic portion at the parts of the front surface and the rear surface of the protector, which are surrounded by the dashed lines.

In contrast, the protector 160 of the present embodiment includes the front smooth portion 192 and the rear smooth portion 193, which are arranged with the uneven portion 191 located in between as described above. The boundary surfaces between the front smooth portion 192 and the rear smooth portion 193 and the plastic portion are parallel to the thickness direction of the bottom plate 161 (the axial direction of the collar 190). Thus, even if the difference in thermal expansion coefficient between plastic and metal causes the bottom plate 161 to be displaced in the thickness direction on the boundary surface between the plastic portion and the metal portion, the formation of gaps between the plastic portion and the collar 190 is limited. This allows the protector 160 to prevent the passage of oil or rainwater at the front smooth portion 192 and the rear smooth portion 193, thereby ensuring the sealing performance.

The advantages of the present embodiment will now be described.

(1) The uneven portion 191 prevents each collar 190 from being removed from the protector 160, and the front smooth portion 192 and the rear smooth portion 193 ensure the sealing performance between the plastic portion and the outer circumferential surface of the collar 190. This prevents the removal of the collar 190 and ensures the sealing performance.

(2) In the uneven portion 191 of the collar 190, plastic may not sufficiently enter the troughs during insert-molding. The front smooth portion 192 and the rear smooth portion 193 are smooth surfaces without a recess or a projection. This allows the plastic portion to easily come into contact with the metal portion. Thus, the sealing performance is easily ensured. This eliminates the need to arrange, for example, an additional seal to ensure the sealing performance.

(3) The uneven portion 191 is located between the front smooth portion 192 and the rear smooth portion 193. This allows the front smooth portion 192 and the rear smooth portion 193 to seal oil or rainwater and thus prevents oil or rainwater from entering the uneven portion 191.

(4) The smooth portions (front smooth portion 192 and the rear smooth portion 193) are respectively arranged at the portions of the outer circumferential surface of the collar 190 that are adjacent to the front surface 161a and the rear surface 161b of the bottom plate 161 of the protector 160. This ensures the sealing performance. Thus, the entry of oil or rainwater from the front surface 161a of the bottom plate 161 and from the rear surface 161b of the bottom plate 161 is prevented. That is, oil or rainwater is prevented from entering the entire boundary surface between the collar 190 and the plastic portion of the protector 160.

(5) Approximately one third of the outer circumferential surface of the collar 190 located closer to the collar front surface 194 in the dimension of the thickness direction of the collar 190 is the front smooth portion 192. In the same manner, approximately one third of the outer circumferential surface of the collar 190 located closer to the collar rear surface 195 in the dimension of the thickness direction of the collar 190 is the rear smooth portion 193. That is, on the outer circumferential surface of the collar 190, each of the front smooth portion 192 and the rear smooth portion 193, between which the uneven portion 191 at the middle part in the thickness direction of the collar 190 is located, accounts for twenty percent or more of the collar 190 in the dimension of the thickness direction of the collar 190. This ensures the areas occupied by the smooth portions on the outer circumferential surface of the collar 190 and thus ensures the sealing performance.

(6) The protector 160 is mostly made of a carbon fiber reinforced plastic, which has a higher specific strength than metal. Thus, the internal combustion engine 100 of the present embodiment is lighter than, for example, an internal combustion engine in which a metal protector is arranged and the high-pressure fuel pump 90 is protected by the metal protector. Among fiber reinforced plastics, carbon fiber reinforced plastic particularly has a high specific strength. This is especially advantageous for reducing the weight of the internal combustion engine 100.

(7) Utilizing the elasticity of the plastic of which the protector 160 is made, vibration that occurs when the high-pressure fuel pump 90 is running can be dampened. This reduces the operating noise of the high-pressure fuel pump 90 emitted into the air.

(8) When plastic members are fastened by bolts and continue to be used under a high-temperature environment, the plastic members undergo creep deformation. When the creep deformation occurs, the fastening force produced by the bolts becomes low, thereby facilitating loosening of the bolts. In the protector 160, the metal collars 190 configure portions of the bottom plate 161 that are held between the mounting surface of the cam cap 70 and the flange 97 and through which the bolts 180 are inserted. That is, the metal collars 190, which are less likely to undergo creep deformation than plastic, configure the bolt insertion portions of the bottom plate 161 where load resulting from the fastening particularly tends to act. This limits decreases in the fastening force that result from creep deformation.

(9) The collars 190 are insert-molded. Thus, for example, as comparted to when the bottom plate 161 has a hole into which each collar 190 is press-fitted and the collar 190 is press-fitted into the hole, the removal of the collar 190 from the bottom plate 161 is limited in the present embodiment.

(10) The uneven portion 191 includes the protrusions 196, each of which has a V-shaped cross section. Thus, the front surface of each protrusion 196 intersects the direction of displacement of the carbon fiber reinforced plastic portion, which configures the bottom plate 161, resulting from thermal expansion or thermal contraction. Accordingly, when thermal expansion or thermal contraction causes the carbon fiber reinforced plastic portion to be displaced, the plastic portion is pressed against the front surface of the protrusion 196. This closes the gaps between the plastic portion and the collars 190 and thus ensures the sealing performance.

(11) The collars 190 are insert-molded into the protector 160. This eliminates the need for machining that is required when using, for example, the structure in which the collars 190 are press-fitted into the protector 160. Thus, for example, there is no need to provide a flaring portion in the distal end of each collar 190 or provide a flaring portion in the opening of the hole into which the collar 190 is press-fitted.

(12) The method for forming the through-hole 162 in the bottom plate 161 of the protector 160 may include, for example, a method for hardening a fiber reinforced plastic to form the bottom plate 161 and then forming the through-hole 162 in the bottom plate 161 through drilling. However, in this case, the cut surfaces of the reinforcing fibers are exposed on the inner circumferential surface of the through-hole 162. If the cut surfaces of the reinforcing fibers are exposed on the inner circumferential surface of the through-hole 162, the seal ring 163 may be damaged by the reinforcing fibers when the high-pressure fuel pump 90 is inserted into the through-hole 162. This may lower the sealing performance. In the above-described method for manufacturing the protector 160, the large-diameter pin 310 is arranged on the lower mold 300. Then, the preform 169, through which the large-diameter pin 310 is inserted, is compressed and heated so that the plastic portion derived from the preform 169 is in contact with the large-diameter pin 310. This forms the through-hole 162, through which the high-pressure fuel pump 90 is inserted. Thus, in the present embodiment, the plastic flows to the boundary surface with the large-diameter pin 310. This limits the exposure of the reinforcing fibers on the inner circumferential surface of the through-hole 162. Accordingly, the seal ring 163 is less likely to be damaged, thereby limiting decreases in the sealing performance.

The present embodiment may be modified as described below. The present embodiment and the following modifications may be implemented in combination with each other as long as technical contradiction does not occur.

In the above-described example, the protector 160 is configured such that the front smooth portion 192 is adjacent to the collar front surface 194 of each collar 190 and the rear smooth portion 193 is adjacent to the collar rear surface 195 of each collar 190. However, the smooth portions do not have to be adjacent to the collar front surface 194 and the collar rear surface 195. For example, when the portions of the collar 190 that are respectively adjacent to the collar front surface 194 and the collar rear surface 195 are chamfered, the portions of the outer circumferential surface of the collar 190 that are respectively adjacent to the collar front surface 194 and the collar rear surface 195 are no longer surfaces parallel to the thickness direction of the collar 190. Thus, in this case, the portions of the outer circumferential surface of the collar 190 that are respectively adjacent to the collar front surface 194 and the collar rear surface 195 are no longer smooth portions. Even if the portions of the outer circumferential surface of the collar 190 that are respectively adjacent to the collar front surface 194 and the collar rear surface 195 are not smooth portions, the sealing performance is ensured at the portions where the smooth portions are arranged as long as the smooth portions are arranged on at least part of the outer circumferential surface of the collar 190.

The sizes of smooth portions may be changed. The sealing performance is further ensured when at least smooth portions are arranged on the outer circumferential surface of each collar 190 than when smooth portions are not provided.

On the outer circumferential surface of each collar 190, the uneven portion 191 does not have to be located between two smooth portions. As long as the outer circumferential surface of each collar 190 includes at least a smooth portion, the sealing performance is ensured as compared to when a smooth portion is not provided. Thus, the uneven portion 191 does not necessarily have to be located between two smooth portions. That is, only one smooth portion may be arranged on the outer circumferential surface of the collar 190.

In the above-described example, the uneven portion 191 includes three protrusions 196. However, the uneven portion 191 simply needs to include recesses and projections arranged alternately in the thickness direction of the collar 190, and the specific structure of the uneven portion 191 may be changed. For example, when an uneven portion includes protrusions, the number of the protrusions may be changed. Additionally, the cross-sectional shape of each protrusion does not have to be V-shaped. Further, an uneven portion may include protuberances instead of protrusions that are continuous with one another in the circumferential direction.

The protector 160 does not necessarily have to protect the high-pressure fuel pump 90 from collision with the cowl top panel 200. The components of the vehicle that are likely to collide with the high-pressure fuel pump 90 differ depending on the layout of the vehicle components. Thus, the protector 160 simply needs to include the wall plate 165 located between the high-pressure fuel pump 90 and the components that are likely to collide with the high-pressure fuel pump 90.

In the above-described example, the wall plate 165 of the protector 160 is configured by the front wall 166, the first side wall 167, and the second side wall 168. Instead, the structure and shape of the wall plate 165 may be changed. For example, the wall plate 165 may be configured by the front wall 166 and the first side wall 167 without the second side wall 168. Alternatively, the wall plate 165 may be configured only by the front wall 166 without the first side wall 167.

In the above-described example, the high-pressure fuel pump 90 is a plunger pump driven by the exhaust camshaft 110. However, the high-pressure fuel pump 90 does not have to be a plunger pump. Alternatively, the high-pressure fuel pump 90 may be driven by the intake camshaft 120. As another option, the high-pressure fuel pump 90 does not have to be driven by a camshaft and may be coupled to and driven by a crankshaft.

Further, the high-pressure fuel pump 90 may be an electric pump incorporating an electric actuator 98 that drives the plunger 91. That is, the high-pressure fuel pump 90 may be an electrically-driven pump. This eliminates the need for the protector 160 to have through-holes 162 through which the plunger 91 is inserted. This also increases the flexibility for the position where the high-pressure fuel pump 90 is coupled. For example, the high-pressure fuel pump 90 may be coupled to the cylinder block 30.

The protector 160 does not have to be made of a carbon fiber reinforced plastic. The material of reinforcing fiber may be changed. For example, the protector 160 may be made of a glass fiber reinforced plastic, which is reinforced by glass fiber.

In the manufacturing method of the above-described embodiment, a preform formed by laminating sheets is insert-molded by inserting the preform into a mold. However, such a manufacturing method does not have to be used as a method for manufacturing the protector 160. For example, other methods may be used to form a preform in which reinforcing fibers are laminated in the thickness direction. As an example, a preform may be formed by mixing reinforcing fibers with thermosetting plastic and repeatedly applying the mixture to the preform. Even when such a method is used to form a preform, a preform in which reinforcing fibers are laminated in the thickness direction can be formed.

Further, the protector 160 may be configured by a plate-shaped fiber reinforced plastic portion in which reinforcing fibers are not laminated in the thickness direction of the fiber reinforced plastic portion. Even in this case, the uneven portion 191 is arranged on the outer circumferential surface of the collar 190, and the smooth portions are lined with the uneven portion 191 in the thickness direction of the fiber reinforced plastic portion. This prevents the passage of oil or rainwater at the smooth portions and thus ensures the sealing performance.

Various changes in form and details may be made to the examples above without departing from the spirit and scope of the claims and their equivalents. The examples are for the sake of description only, and not for purposes of limitation.

Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A protector comprising:
   a plate-shaped fiber reinforced plastic portion made of a fiber reinforced plastic, the fiber reinforced plastic portion defining a thickness direction; and
   a metal collar insert-molded into the fiber reinforced plastic portion, wherein
   the protector and a high-pressure fuel pump are fastened to an engine body of an internal combustion engine by a bolt inserted through the collar,
   the protector protects the high-pressure fuel pump,
   an outer circumferential surface of the collar includes
      an uneven portion including recesses and projections arranged alternately in the thickness direction of the fiber reinforced plastic portion, and
      a smooth portion including a smooth surface parallel to the thickness direction,
   the uneven portion and the smooth portion are arranged in the thickness direction on the outer circumferential surface of the collar, and
   the collar is held between a flange of the high-pressure fuel pump and the engine body.

2. The protector according to claim 1, wherein the fiber reinforced plastic portion has reinforcing fibers that are laminated in the thickness direction.

3. The protector according to claim 1, wherein
   the smooth portion is one of two smooth portions, and
   the uneven portion is located between the two smooth portions in the thickness direction on the outer circumferential surface of the collar.

4. The protector according to claim 3, wherein
   the protector includes a front surface and a rear surface,
   the collar includes a collar front surface exposed on the front surface of the protector and a collar rear surface exposed on the rear surface of the protector,
   the outer circumferential surface of the collar includes a front surface adjacent portion adjacent to the collar front surface and a rear surface adjacent portion adjacent to the collar rear surface, and
   the front surface adjacent portion and the rear surface adjacent portion are the smooth portions.

5. The protector according to claim 3, wherein
   the uneven portion is located at a middle part of the outer circumferential surface of the collar in the thickness direction, and
   each of the two smooth portions, between which the uneven portion is located, accounts for twenty percent or more of a dimension of the collar in the thickness direction.

6. The protector according to claim 1, wherein the fiber reinforced plastic is a carbon fiber reinforced plastic.

* * * * *